United States Patent
Kehr

(10) Patent No.: US 11,598,415 B2
(45) Date of Patent: Mar. 7, 2023

(54) PARKING LOCK

(71) Applicant: ZF Friedrichshafen AG, Friedrichshafen (DE)

(72) Inventor: Ulrich Kehr, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 199 days.

(21) Appl. No.: 16/850,420

(22) Filed: Apr. 16, 2020

(65) Prior Publication Data
US 2020/0332892 A1 Oct. 22, 2020

(30) Foreign Application Priority Data
Apr. 17, 2019 (DE) ...................... 10 2019 205 608.3

(51) Int. Cl.
| | | |
|---|---|---|
| *F16H 63/34* | (2006.01) | |
| *B60T 1/00* | (2006.01) | |
| *F16H 55/17* | (2006.01) | |

(52) U.S. Cl.
CPC .......... *F16H 63/3425* (2013.01); *B60T 1/005* (2013.01); *F16H 55/17* (2013.01); *F16H 2055/173* (2013.01); *F16H 2055/176* (2013.01)

(58) Field of Classification Search
CPC ................. F16H 63/3425; F16H 55/17; F16H 2055/176; F16H 2055/173; B60T 1/005; F16C 2226/80
See application file for complete search history.

(56) References Cited

U.S. PATENT DOCUMENTS

| | | |
|---|---|---|
| 288,134 A | 11/1883 | Stone |
| 2,544,809 A | 4/1945 | Stanley |
| 10,808,842 B2 * | 10/2020 | Scalici ................ F16H 63/3466 |
| 10,823,233 B2 * | 11/2020 | Xiong ...................... B25J 9/102 |
| 2002/0000135 A1 | 1/2002 | Zaps |
| 2013/0294825 A1 * | 11/2013 | Loeffler .................... F16D 1/06 403/359.1 |
| 2019/0085891 A1 * | 3/2019 | Kamikawa ............ B29C 66/223 |
| 2020/0316358 A1 * | 10/2020 | Feith ..................... A61M 39/10 |

* cited by examiner

*Primary Examiner* — Richard W Ridley
*Assistant Examiner* — Aimee Tran Nguyen
(74) *Attorney, Agent, or Firm* — Dority & Manning, P.A.

(57) ABSTRACT

A gearwheel (10), in particular a parking interlock gear, includes an annular body (1). The annular body includes a first toothing (2), arranged on an outer circumference of the annular body, for engaging a locking pawl (20), and a second toothing (3), arranged on an inner circumference of the annular body, for the form-locking connection to a shaft (30).

11 Claims, 4 Drawing Sheets

PARKING LOCK

CROSS-REFERENCE TO RELATED APPLICATION

The present application is related and has right of priority to German Patent Application No. 10 2019 205 608.3 filed on Apr. 17, 2019, which is incorporated by reference in its entirety for all purposes.

FIELD OF THE INVENTION

The invention relates to a gearwheel, in particular a parking interlock gear for an automatic transmission, an automated transmission, or an electric drive, and a parking lock arrangement.

BACKGROUND

A parking lock is a mechanical interlock of the transmission output shaft at the transmission housing. Mostly, for this purpose, a locking pawl, which is attached to the housing, is engaged into a toothed gear of the output shaft. For road vehicles with electric traction drives, a mechanical parking lock is often required, which interlocks the drive when the vehicle is at a standstill, in order to prevent the vehicle from unintentionally rolling away.

Usually, this mechanical parking lock is implemented with the aid of an actuatable locking pawl, which engages into a groove of a gearwheel, in particular of a parking interlock gear. Upon engagement of the pawl, there may be an impact onto the parking lock if the parking lock is engaged not when the vehicle is at a standstill, but rather moving at a slow speed. This is the case, for example, when the vehicle is parked on a slight downhill gradient. This can also occur for the case in which there is a "tooth-on-tooth position" during the engagement of the parking lock and the pawl cannot engage until the vehicle rolls away. This can also occur for the case in which the parking lock is engaged by the vehicle driver before the vehicle has come to a complete stop. The parking lock, in particular the locking pawl and the parking interlock gear, must be sized in such a way that they withstand this load.

In the case of electric traction drives, the rotor of the electric machine has a considerable inertial mass. During the engagement of the parking lock from a slow speed, not only the vehicle, but also the rotor of the electric machine must be decelerated, which brings about a considerable shock loading of the parking lock. The shock energy is dissipated with the aid of a subsequent torsion oscillating process, which represents a further load on the system and is perceived as uncomfortable by the vehicle occupants.

Axial-translatory annular springs are known as components that cushion and dampen shocks, for example, as cushioning springs in railway vehicles.

SUMMARY OF THE INVENTION

Example aspects of the invention provide an alternative gearwheel, in particular a parking interlock gear, and an alternative parking lock arrangement.

The gearwheel, which, in particular, is a parking interlock gear for an automatic transmission, an automated transmission, or an electric drive, includes an annular body. A first toothing for the engagement of a locking pawl is arranged on the outer circumference of the annular body. A second toothing for the form-locking connection to a shaft is arranged on the inner circumference of the annular body. Other terms for "parking interlock gear" are "parking interlock ring" or "parking gear".

The first toothing is configured for cooperating with the locking pawl in a known way. The second toothing is provided for resting on a shaft of the transmission in a form-locking manner. The shaft includes a third toothing, which corresponds to or complements the second toothing of the gearwheel.

Toothing is understood to be the shaping of a component, in particular of the annular body or the shaft, with notches, prongs, or splines for establishing a connection and/or for increasing the friction. The term "toothing" can refer to the shape and arrangement as well as to the manufacture of the teeth.

The parking lock arrangement includes the above-described gearwheel as well as a shaft on which the gearwheel is mounted. In a mounted condition of the parking lock arrangement, the second toothing and the third toothing are preferably arranged radially opposite one another with form-lockingly intermeshing tooth flanks. In other words, there is a shaft-hub connection, which is preferably implemented with the aid of a fitting toothing (also referred to as a spline). The fitting toothing is a multiple-driver connection, wherein the torque is transmitted by the tooth flanks. The shaft is externally geared and the gearwheel is internally geared. The fitting toothing can be present, for example, in the form of a splined shaft or a radially aligned Hirth toothing. In this way, power, torque, or rotational speed can be transmitted from the shaft onto the gearwheel.

The second toothing and the third toothing do not need to be radially acting, i.e., they do not need to be arranged radially opposite one another. The second toothing and the third toothing can also act axially, i.e., they can also extend in the axial direction. The Hirth toothing is an example of an axially active, planar side toothing.

The gearwheel can be mounted on various shafts of the transmission, in particular on the transmission input shaft, on an intermediate shaft of the transmission, on the output shaft, or on a shaft connected to the particular shafts. Particularly preferably, the shaft is the rotor shaft of an electric machine, since, in this case, the transmission can appropriately reduce the torque from the gear via the ratio. In this way, the gearwheel can be designed to have particularly small dimensions.

The second toothing is designed, in particular, in such a way that, upon engagement of the locking pawl into the rotating gearwheel, the gearwheel expands in the radial direction with respect to the form-lockingly connected shaft.

The second toothing and the third toothing can include a plurality of teeth with oblique tooth flanks.

The surface of the tooth flanks of the teeth of the second toothing and the third toothing can be designed in different ways. The oblique tooth flanks can be, for example, planar or crowned on their surface, i.e., designed to be slightly rounded. Crowned tooth flanks prevent edge wear during the turning of the second toothing and the third toothing. It is conceivable to design only the second toothing to be crowned and the third toothing to be planar or to design only the third toothing to be crowned and the second toothing to be planar. It is also conceivable to design both the second toothing and the third toothing to be crowned.

If the locking pawl of the parking lock arrangement engages into the first toothing while the shaft—on which the parking interlock gear is mounted—turns, the gearwheel turns with respect to the shaft and is expanded in the circumferential direction. In other words, the diameter of the gearwheel increases. In the process, the gearwheel absorbs the shock energy while the gearwheel cushions the torque shock. In addition, as a result, the load on the locking pawl is substantially reduced. Due to the friction of the second toothing, in addition, the arising torsional vibration is damped, whereby the subsequent torsional vibration of the torsional vibration system of the parking lock arrangement subsides faster. During this process, the gearwheel is essentially under tension. Very generally, the invention therefore makes an optimal absorption of energy possible, i.e., a homogeneous energy distribution across the annular body via deformation of the ring.

The angle of two adjacent tooth flanks is preferably selected in such a way that a self-locking of the shaft is avoided and a return of the shaft to the neutral position after the unloading of the parking lock arrangement is ensured.

In one preferred example embodiment of the invention, the angle α—opening in the direction of the axis—of two mutually adjacent tooth flanks has an angle between one hundred and forty degrees (140°) and one hundred and sixty-six degrees (166°).

This angular range prevents, on the one hand, a self-locking of the parking lock system, which arises when the angle is too small. In other words, in this angular range, a self-locking is prevented when the second toothing and the third toothing are turned relative to one another, wherein the parking lock system includes at least the shaft and the gearwheel. The self-locking should be avoided so that the rest condition can set in again after the disengagement of the locking pawl, wherein "rest condition" means that the second toothing and the third toothing are not turned relative to one another, i.e., the diameter of the gearwheel is minimal. On the other hand, this angular range allows for a spring travel that is sufficiently great for absorbing the shock energy. An angle that is too great would reduce the spring travel.

An angle between one hundred and fifty degrees and one hundred and fifty-six degrees (150°≤α≤156°) has proven to be particularly preferred. This narrow angular range is optimal, on the one hand, for preventing the self-locking and, on the other hand, for a sufficiently great spring travel.

According to a further example aspect of the invention, a parking lock arrangement is provided, which includes an above-described gearwheel and a shaft on which the gearwheel is arranged. The advantages explained with respect to the gearwheel also apply, similarly, to the parking lock arrangement including such a gearwheel.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous example embodiments of the invention, which are explained in the following, are represented in the drawings. Wherein.

DETAILED DESCRIPTION

Figure 1:
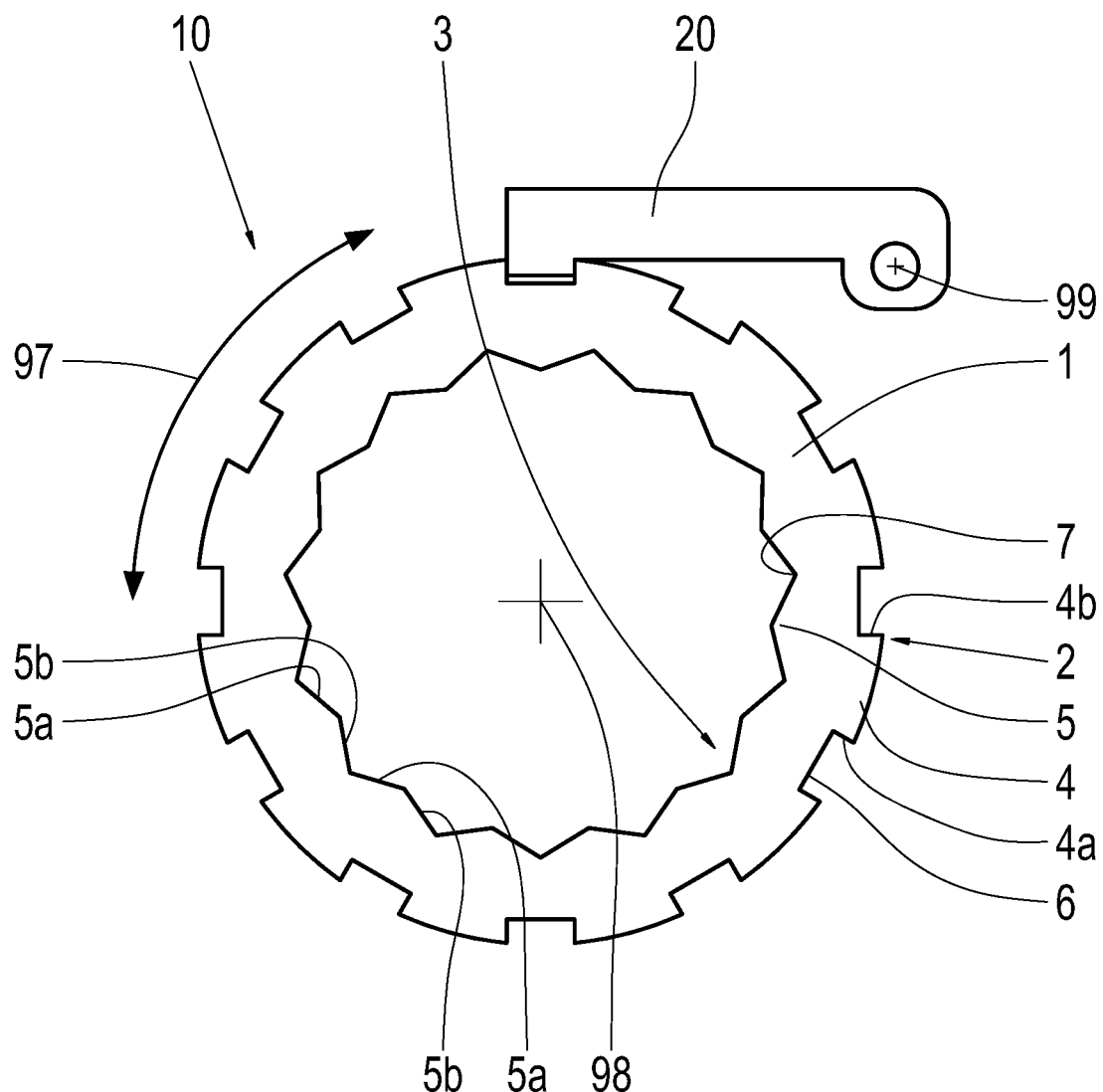
FIG. 1 shows a gearwheel in a preferred example embodiment in an axial sectional view.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a gearwheel 10 in the form of a parking interlock gear of a parking lock arrangement (not represented in greater detail) of a vehicle transmission (not represented) and a locking pawl 20, which is engaged into a first toothing 2 of the parking interlock gear 10. The parking interlock gear 10 is arranged coaxially to an axis 98. The locking pawl 20 is arranged coaxially to an axis 99. The two axes 98, 99 are arranged axially parallel to one another.

The parking interlock gear 10 includes an annular body 1. The annular body 1 includes the first toothing 2, arranged on the outer circumference of the annular body 1, for engaging the locking pawl 20. The annular body 1 also includes a second toothing 3, arranged on the inner circumference of the annular body 1, for the form-locking connection to a shaft (not represented). Both toothings 2, 3 are radially acting toothings. The first toothing 2 includes, in a known way, teeth 4 including straight-cut tooth flanks 4a, 4b. Appropriate recesses are present between adjacent teeth 4. The inner toothing 3 include teeth 5 including lateral flanks 5a, 5b. In contrast to the flanks 4a, 4b of the teeth 4 of the first toothing 2, the tooth flanks 5a, 5b of the teeth 5 of the second toothing 3 are oblique. There is an angle α between adjacent oblique tooth flanks 5a, 5b. The angle α is in a range of one hundred and fifty degrees and one hundred and fifty-six degrees (150°≤α≤156°) (see e.g., FIG. 3). In other words, the value of the lead angle of the tooth flank 5a, 5b is between twelve degrees and fifteen degrees (12°≤β≤15°).

Figure 2:
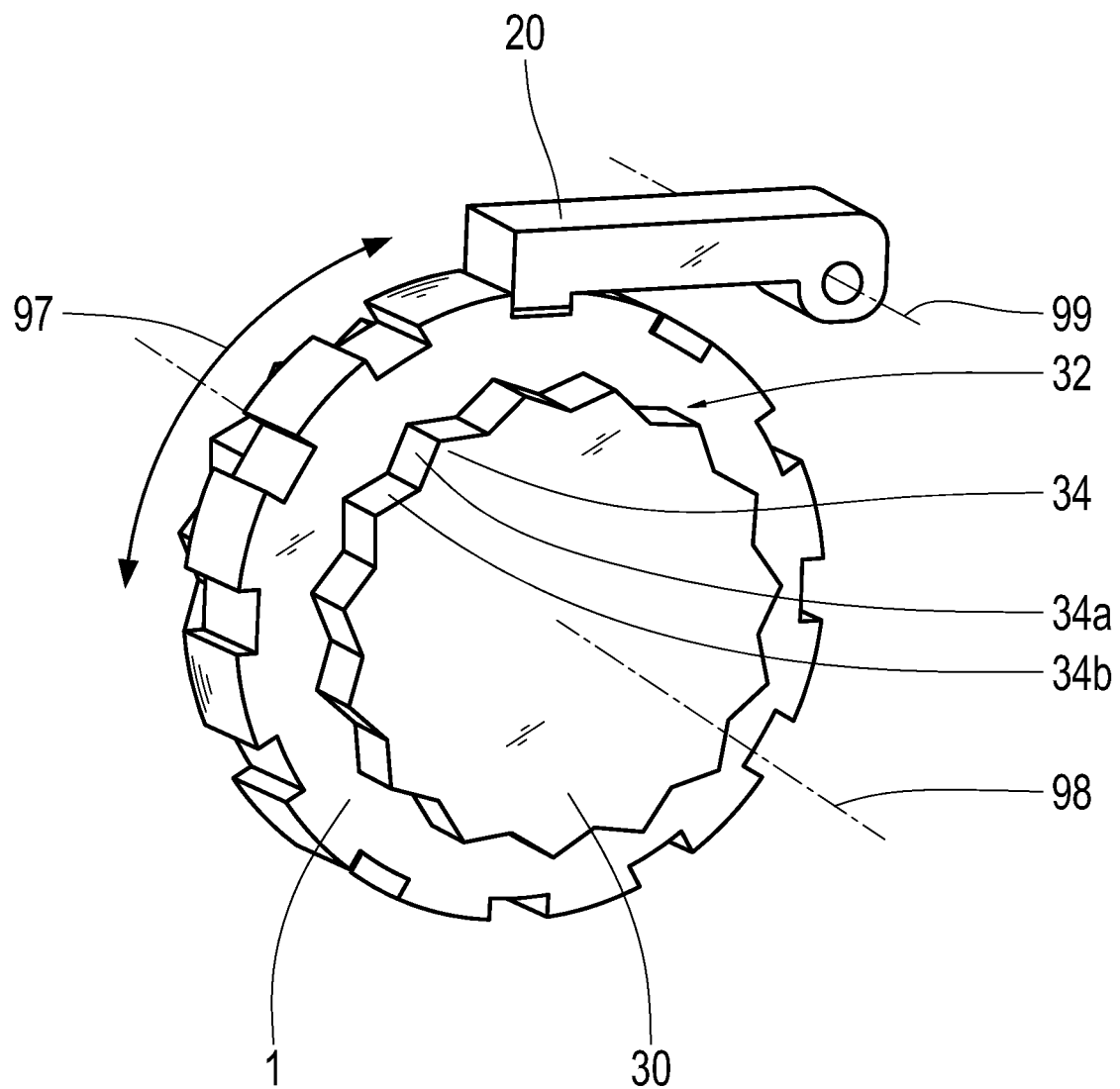
FIG. 2 shows the example gearwheel from FIG. 1 in a perspective view.

FIG. 2 shows the parking interlock gear 10 from FIG. 1 and a shaft 30 on which the parking interlock gear 10 is arranged, in a perspective representation. The shaft 30, which is a rotor shaft of an electric machine, includes a third toothing 32, which corresponds to or complements the second toothing 3 of the parking interlock gear 10. The third toothing 32 is therefore a radially acting toothing, i.e., a toothing extending in the radial direction, including teeth 34. The teeth 34 include oblique tooth flanks 34a, 34b. One tooth flank 34a rests against a tooth flank 5a, while one tooth flank 34b rests against a tooth flank 5b. The shaft 30, which, in the present case, is a rotor shaft of an electric motor (not represented in greater detail), therefore form-lockingly transmits, via mating surfaces 34a, 34b, onto the mating surfaces 5a, 5b and, therefore, onto the parking interlock gear 10.

If the locking pawl 20 is engaged into the first toothing while the parking interlock gear 10 rotates, the parking interlock gear 10 turns relative to the shaft 30 and is expanded in the circumferential direction 97, i.e., in other words, the radius of the parking interlock gear 10 increases. In the process, the parking interlock gear 10 absorbs the shock energy while the parking interlock gear 10 cushions the torque shock. As a result, on the one hand, the load on the locking pawl 20 can be substantially reduced and, on the other hand, the arising torsional vibration can be damped by the friction of the inner toothing.

Due to the friction of the second toothing, in addition, the arising torsional vibration is damped, whereby the subsequent torsional vibration of the torsional vibration system of the parking lock device subsides faster. During this process, the gearwheel is essentially under tension. Very generally, the invention therefore makes an optimal absorption of energy possible, i.e., a homogeneous energy distribution across the annular body via deformation of the ring.

With respect to the present example, the torsional vibration system can be described in a simplified manner as follows: The rotor of the electric machine implements a torsional vibration. The torsion spring is formed from the elasticity of all components located in the power flow during the engagement of the pawl. These are mainly the elasticity of the appropriate parts of the connecting shaft(s), the elasticity of the parking interlock gear 10, the locking pawl 20, and the housing portions that absorb the forces from the pawl bearing. The oscillating mass consists essentially of the moment of inertia of the rotor of the electric machine.

Figure 3:
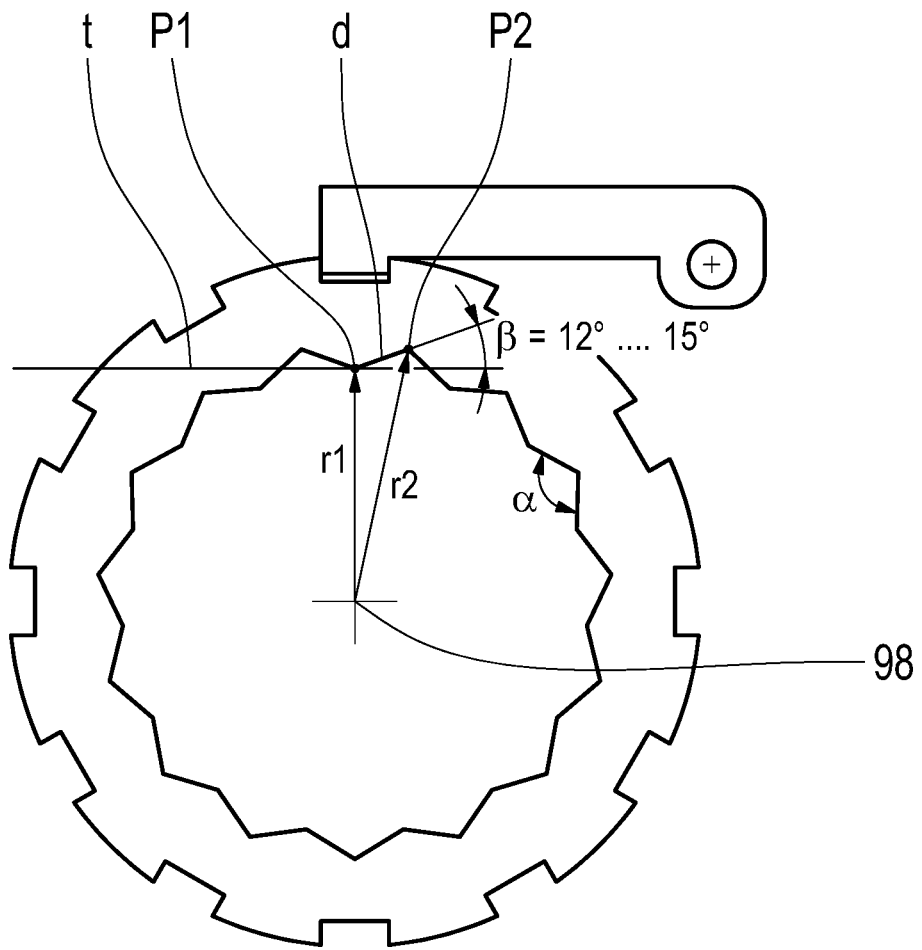
FIG. 3 shows the example gearwheel from FIG. 1 with a representation of the preferred angle of the second toothing.

FIG. 3 shows the parking interlock gear 1, wherein, additionally, the preferred angle α is indicated; the preferred angle α is between one hundred and fifty degrees (150°) and one hundred and fifty-six degrees (156°) in the present example case.

In addition, the lead angle β is represented. The angle β is spanned, on the one hand, by a tangent that extends through the point P1 and by a connecting line that extends through the points P1 and P2. The point P1 is the point at which adjacent tooth flanks 5a, 5b intersect and which intersection point has the shortest distance r1 to the axis 98 of the parking interlock gear 10. P2 is the point at which adjacent tooth flanks 5a, 5b intersect and which intersection point P2 has the greatest distance r2 to the center of the parking interlock gear 10. This angle β is the so-called lead angle and the value is between twelve degrees and fifteen degrees ($12° \leq \beta \leq 15°$).

The relationship between the angles α and β is expressed as a formula as follows:

$$\alpha = 180 - 2\beta$$

Figure 4A:
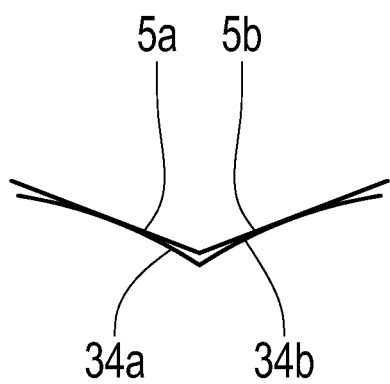
FIG. 4a shows oblique tooth flanks utilizable in the example gearwheel from FIG. 1.
Figure 4B:
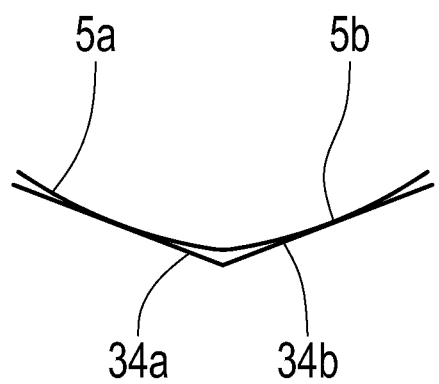
FIG. 4b shows oblique tooth flanks utilizable in the example gearwheel from FIG. 1.

FIGS. 4a and 4b show the characteristics of the oblique tooth flanks of the type that can be utilized in the embodiments according to FIGS. 1 through 3. In FIG. 4a, the teeth 5 include oblique and planar tooth flanks 5a, 5b. The tooth flanks 34a, 34b of the teeth 34, however, are designed to be oblique and crowned. This is reversed in FIG. 4b: the tooth flanks 34a, 34b of the teeth 34 are designed to be oblique and planar, while the tooth flanks 5a, 5b of the teeth 5 are designed to be oblique and crowned.

The invention was comprehensively described and explained with reference to the drawings and the description. The description and the explanation are to be understood as an example and not to be limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 annular body
2 first toothing, outer toothing
3 second toothing, inner toothing
4 tooth, teeth of the first toothing
4a, 4b tooth flanks
5 tooth, teeth
5a, 5b tooth flanks, mating surface
6 recess(es) of the first toothing
7 recess(es) of the second toothing
10 gearwheel, parking interlock gear
20 locking pawl
30 shaft, rotor shaft
32 third toothing
34 tooth, teeth of the third toothing
34a, 34b tooth flanks, mating surface
97 direction of rotation of shaft, gearwheel; direction of expansion (circumferential direction)
98 axis of the gearwheel, shaft
99 swivel axis of the locking pawl
P1 point of the inner toothing having the shortest distance to the center
P2 point of the inner toothing having the greatest distance to the center
t tangent
d connecting line between P1 and P1
r1 radius, distance between center and P1
r2 radius, distance between center and P2

The invention claimed is:

1. A gearwheel (10) that is a parking interlock gear for a parking lock arrangement, comprising:
    an annular body (1) that includes
        a first toothing (2) configured for engaging a locking pawl (20), the first toothing (2) arranged on an outer circumference of the annular body (1), and
        a second toothing (3) configured for form-locking connection to a shaft (30), the second toothing (3) arranged on an inner circumference of the annular body (1),
        wherein the second toothing (3) is shaped such that, upon engagement of the locking pawl (20) into the rotating gearwheel (10), the gearwheel (10) turns relative to the shaft (30) and expands in a radial direction with respect to the shaft (30).

2. The gearwheel of claim 1, wherein the second toothing (3) comprises a plurality of teeth (5) with oblique tooth flanks (5a, 5b).

3. The gearwheel of claim 2, wherein an angle a is defined between two mutually adjacent tooth flanks (5a, 5b) for each of the plurality of teeth (5) of the second toothing (3), the angle a opening towards an axis (98) of the annular body (1), the angle a selected such that, after unloading of the parking lock arrangement when the gearwheel (10) turns relative to the shaft (30) and contracts in the radial direction with respect to the shaft (30), a self-locking of the shaft (30) is avoided and the gearwheel (10) returns to a neutral position.

4. The gearwheel of claim 3, wherein the angle a is no less than one hundred and forty degrees and no greater than one hundred and sixty-six degrees.

5. The gearwheel of claim 4, wherein the angle a is no less than one hundred and fifty degrees and no greater than one hundred and fifty-six degrees.

6. The gearwheel of claim 1, wherein the first toothing (2) and the second toothing (3) are radially acting toothings.

7. A parking lock arrangement, comprising:
   a shaft (30); and
   a gearwheel (10) arranged on the shaft (30), the gearwheel (10) including an annular body (1) with a first toothing (2) and a second toothing (3), the first toothing (2) configured for engaging a locking pawl (20), the first toothing (2) arranged on an outer circumference of the annular body (1), the second toothing (3) configured for form-locking connection to the shaft (30), the second toothing (3) arranged on an inner circumference of the annular body (1),
   wherein the second toothing (3) is shaped such that, upon engagement of the locking pawl (20) into the rotating gearwheel (10), the gearwheel (10) turns relative to the shaft (30) and expands in a radial direction with respect to the shaft (30).

8. The gearwheel of claim 1, wherein the tooth flanks (5a, 5b) on each of the plurality of teeth (5) of the second toothing (3) are planar or crowned.

9. The gearwheel of claim 1, wherein a lead angle β of each tooth flank (5a, 5b) of the plurality of teeth (5) is no less than twelve degrees and no greater than fifteen degrees.

10. The parking lock arrangement of claim 7, wherein the shaft (30) includes a third toothing (32), the second toothing (3) configured for form-locking connection to the shaft (30) at the third toothing (32).

11. The parking lock arrangement of claim 7, wherein the third toothing (30) comprises a plurality of teeth (34) with oblique tooth flanks (34a, 34b), the tooth flanks (5a, 5b) on each of the plurality of teeth (5) of the second toothing (3) are planar or crowned, and tooth flanks (34a, 34b) on each of the plurality of teeth (34) of the third toothing (34) are planar or crowned.

* * * * *